(12) United States Patent
Spears

(10) Patent No.: US 7,857,357 B2
(45) Date of Patent: Dec. 28, 2010

(54) REINFORCED PIPE FITTING WITH ECCENTRIC FLOW PATH

(76) Inventor: Wayne Spears, P.O. Box 9203, Sylmar, CA (US) 91392

( * ) Notice: Subject to any disclaimer, the term of this patent is extended or adjusted under 35 U.S.C. 154(b) by 168 days.

(21) Appl. No.: 12/103,874

(22) Filed: Apr. 16, 2008

(65) Prior Publication Data

US 2009/0261579 A1 Oct. 22, 2009

(51) Int. Cl.
*F16L 43/00* (2006.01)
(52) U.S. Cl. .................................................... 285/179
(58) Field of Classification Search ................. 285/179, 285/133.3, 129.1
See application file for complete search history.

(56) References Cited

U.S. PATENT DOCUMENTS

| | | | | |
|---|---|---|---|---|
| 1,960,557 A | * | 5/1934 | Snyder | 285/179 |
| 2,303,949 A | * | 12/1942 | Nordell | 285/179 |
| 2,303,950 A | * | 12/1942 | Nordell | 285/179 |
| 2,506,064 A | * | 5/1950 | Llewellyn | 285/179 |
| 3,477,749 A | * | 11/1969 | Albro | 285/179 |
| 4,830,410 A | * | 5/1989 | Wermelinger | 285/179 |
| 5,316,349 A | * | 5/1994 | Rafeld | 285/179 |
| 5,984,374 A | * | 11/1999 | Esser | 285/179 |
| 6,086,116 A | * | 7/2000 | Smahl | 285/179 |

OTHER PUBLICATIONS

"Designing, Operating and Maintaining Piping Systems Using PVC Fittings (A Handbook of Design Guidelines and Precautions)," by Ron D. Bliesner of Keller-Bliesner Engineering, Logan Utah, Published by the PVC Fittings Division of the Irrigation Association, dated Feb. 3, 1987.

* cited by examiner

*Primary Examiner*—David E Bochna
(74) *Attorney, Agent, or Firm*—Denton L. Anderson; Sheldon Mak & Anderson PC

(57) ABSTRACT

A reinforced pipe fitting has a body with a cylindrical first section and a cylindrical second section. The first section has a first longitudinal axis and the second section has a second longitudinal axis. The side walls of the first section intersect the side walls of the second section at a crotch point disposed within the plane defined by the first and second longitudinal axes. The first section defines a first section crotch area pipe stop having a proximal portion disposed proximate to the crotch point and a distal portion disposed opposite the proximal portion. The average thickness of the proximal portion disposed 15° to either side of the plane defined by the first and second longitudinal axes is greater by about 15% than the average thickness of the distal portion disposed 15° to either side of the plane defined by the first and second longitudinal axes.

14 Claims, 5 Drawing Sheets

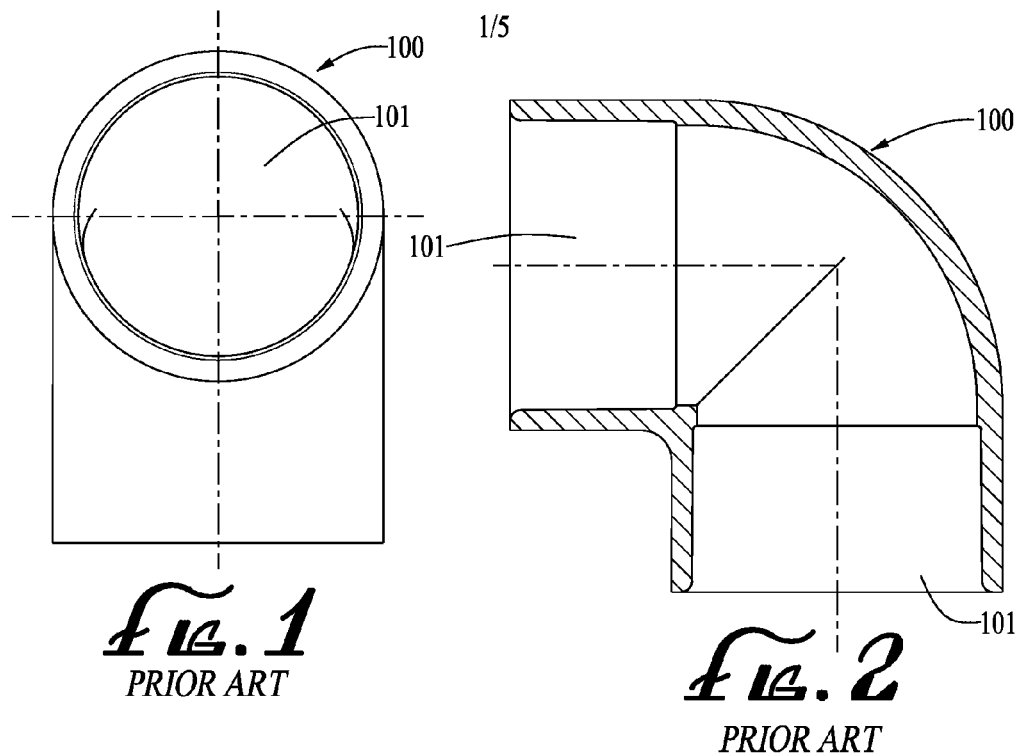
fig.1 PRIOR ART
fig.2 PRIOR ART
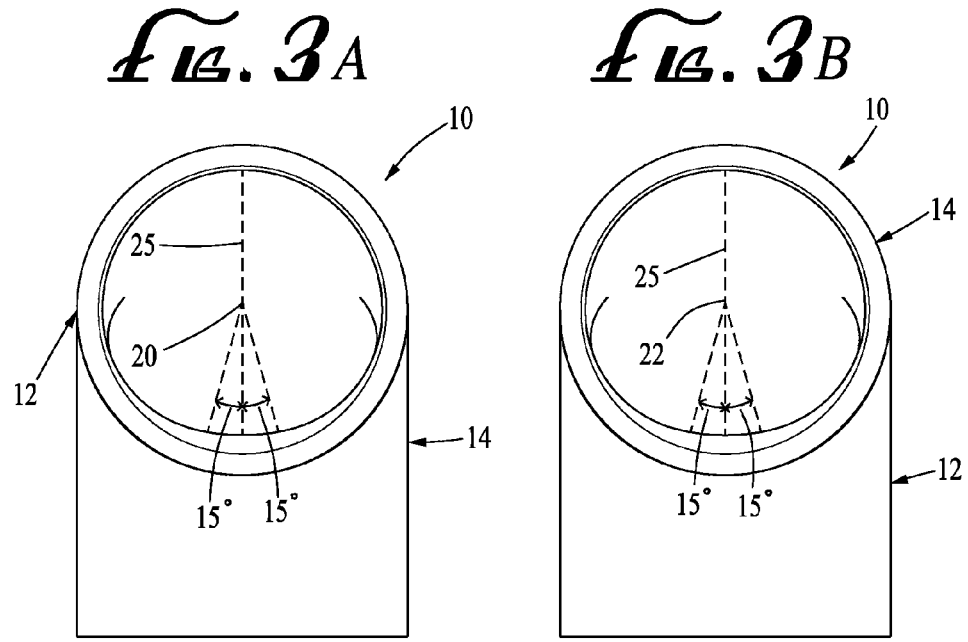
fig.3A
fig.3B

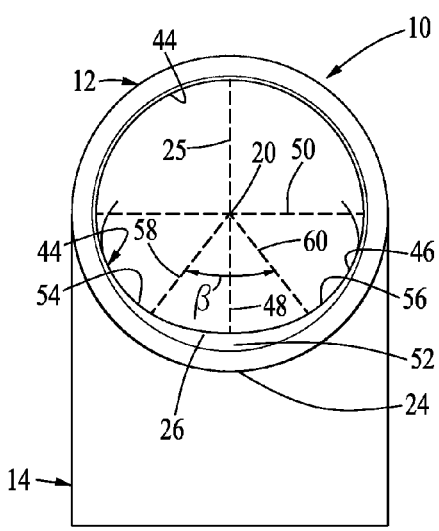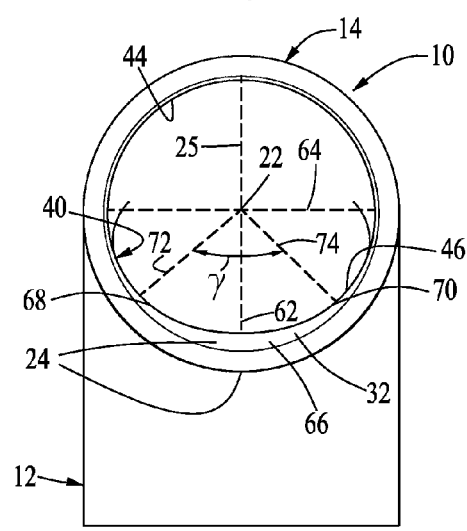

ical pipe fittings of US 7,857,357 B2

REINFORCED PIPE FITTING WITH ECCENTRIC FLOW PATH

FIELD OF THE INVENTION

This invention relates generally to non-metal pipe fittings, such as tees, ells and 45° bends, capable of changing the direction of fluids flowing through such pipe fittings. More specifically, the invention is directed to such pipe fittings wherein the crotch or crotches within such fittings are reinforced.

BACKGROUND OF THE INVENTION

The crotch (or crotches) of non-metal pipe fittings such as tees, ells, 45° bends, crosses, wyes and double wyes is a common failure point when such fittings are subjected to cyclic pressure conditions. The crotch is acted on by the pressurized fluid and is induced towards becoming round or inverted.

Conventional attempts to mitigate these forces have frequently been based on adding material to the outside crotch area using big radii, ribs, tapers, etc. However, the additional material on the outside of the fitting does little to reduce stress in the crotches, and adding material to the outside of the fitting adds cost. In some cases such additional material can make stress in the crotches worse.

Other attempts to mitigate crotch stresses have been based on a reduction to the flow path diameter. Reducing the flow path diameter adds wall section and strength as well as reducing hoop stresses which the fluid applies to the fitting. However, reducing the flow path diameter increases the pressure drop across the fitting and requires unnecessary and costly additional material to portions of the fitting not subject to stresses.

Accordingly, there is a need for a reinforced non-metal pipe fitting which minimizes crotch stress failures while avoiding the aforementioned problems in the prior art.

SUMMARY

The invention satisfies this need. The invention is a reinforced pipe fitting having a cylindrical first section and a cylindrical second section. Each section has side walls and an open end which is circular in cross-section. The first section has a first longitudinal axis and the second section has a second longitudinal axis. The second longitudinal axis intersects the first longitudinal axis at an angle ≡ less than 180°. The side walls of the first section intersect the side walls of the second section at a crotch point disposed within the plane defined by the first and second longitudinal axes. The first section defines a first section crotch area pipe stop having a first section crotch area pipe stop proximal portion disposed proximate to the crotch point and a first section crotch area pipe stop distal portion disposed opposite the first section crotch area pipe section proximal portion. In the invention, the average thickness of the first section crotch area pipe stop proximal portion disposed 15° to either side of the plane defined by the first and second longitudinal axes is greater by about 15% than the average thickness of the first section crotch area pipe stop distal portion disposed 15° to either side of the plane defined by the first and second longitudinal axes.

DRAWINGS

These and other features, aspects and advantages of the present invention will become better understood with reference to the following description, appended claims and accompanying drawings where:

FIG. 1 is an end view of a pipe fitting of the prior art;

FIG. 2 is a cross-sectional side view of the pipe fitting illustrated in FIG. 1;

FIG. 3A is a first end view of a pipe fitting having features of the invention;

FIG. 3B is a second end view of the pipe fitting illustrated in FIG. 3A;

FIG. 6A is a third end view of a pipe fitting having features of the invention;

FIG. 6B is a fourth end view of the pipe fitting illustrated in FIG. 3A;

DETAILED DESCRIPTION

Figure 4:
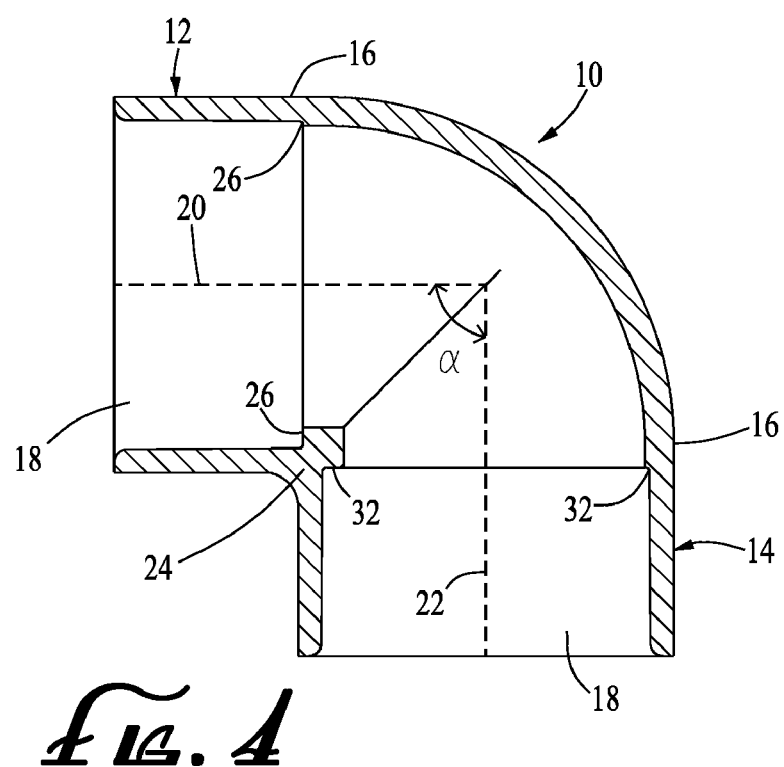
FIG. 4 is a cross-sectional side view of the pipe fitting illustrated in FIGS. 3A and 3B.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is directed to a reinforced pipe fitting 10 having a cylindrical first section 12 and a cylindrical second section 14. The pipe fitting 10 is typically a tee, an ell, a 45° bend, a cross, a wye or a double wye. Each section of the reinforced pipe fitting 10 comprises side walls 16 and an open end 18. Each open end 18 is circular in cross-section. The side walls 16 of the first section 12 are joined in fluid tight communication to the side walls 16 of the second section 14.

Figure 5:
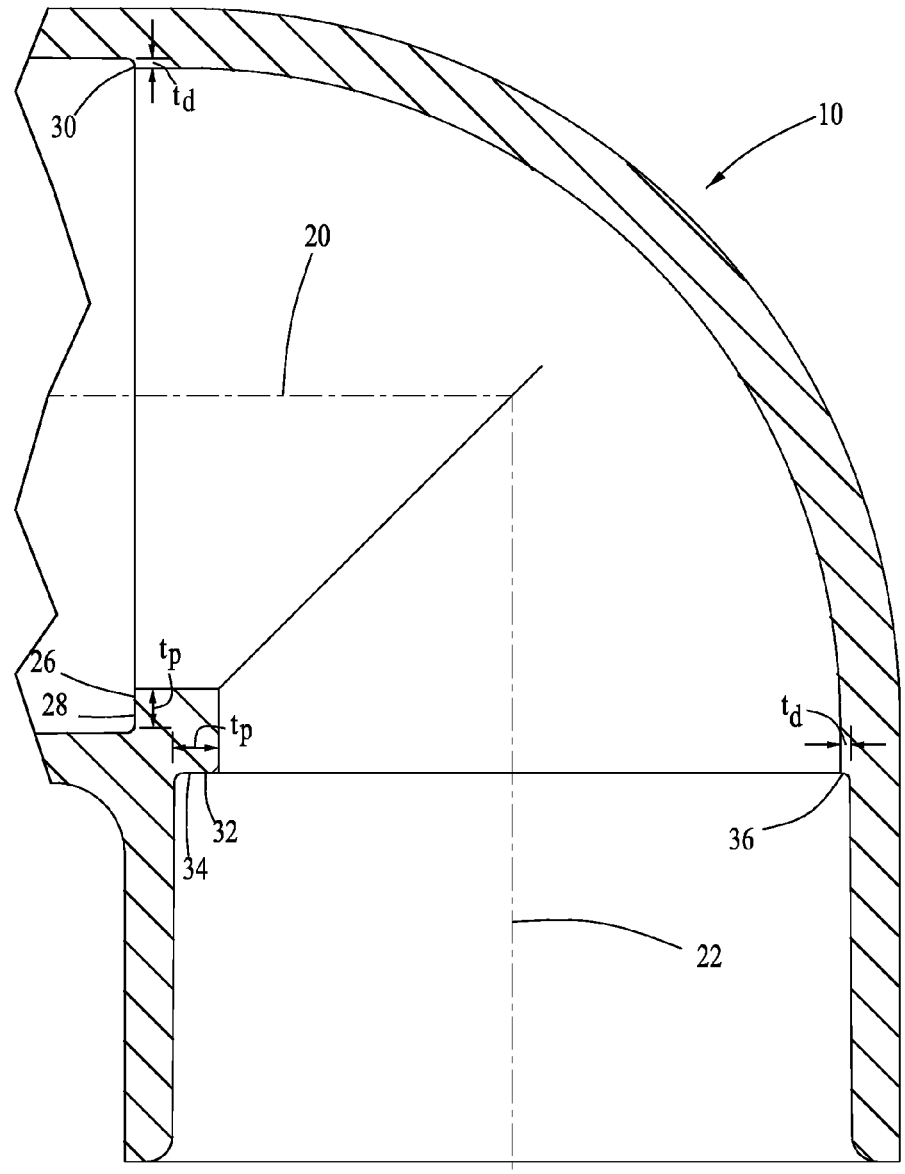
FIG. 5 is a detail cross-sectional side view of the pipe fitting illustrated in FIG. 5.

As best seen in FIGS. 3-5, the first section 12 has a first longitudinal axis 20 and the second section 14 has a second longitudinal axis 22. The second longitudinal axis 22 intersects the first longitudinal axis 20 at an angle α which is less than 180°, and is typically between about 90° and about 180°. The side walls 16 of the first section 12 intersect the side walls 16 of the second section 14 at a crotch point 24 disposed within the plane 25 defined by the first and second longitudinal axes 20 and 22.

The first section 12 defines a first section crotch area pipe stop 26 having a first section crotch area pipe stop proximal portion 28 disposed proximate to the crotch point 24 and a first section crotch area pipe stop distal portion 30 disposed opposite the first section crotch area pipe stop proximal portion 28. In the invention, the average thickness $t_p$ of the first section crotch area pipe stop proximal portion 28 disposed 15° to either side of the plane 25 defined by the first and second longitudinal axes 20 and 22 is greater by about 15% than the average thickness $t_d$ of the first section crotch area pipe stop distal portion 30 disposed 15° to either side of the plane 25 defined by the first and second longitudinal axes 20 and 22.

Typically, the second section 14 of the reinforced pipe fitting of the invention 10 defines a second section crotch area pipe stop 32 having a second section crotch area pipe stop proximal portion 34 disposed proximate to the crotch point 24 and a second section crotch area pipe stop distal portion 36 disposed opposite the second section crotch area pipe stop proximal portion 32. Like that of the first section 12, the average thickness $t_p$ of the second section crotch area pipe stop proximal portion 34 disposed 15° to either side of the plane 25 defined by the first and second longitudinal axes 20 and 22 is greater by about 15% than the average thickness $t_d$ of the section crotch area pipe stop distal portion 36 disposed 15° to either side of the plane 25 defined by the first and second longitudinal axes 20 and 22.

Also typically, the thicknesses $t_p$ of both the proximal portions 28 and 34 of the first section crotch area and second section crotch area pipe stops 26 and 32 disposed precisely within the plane 25 defined by the first and second longitudinal axes 20 and 22 are greater than about 20% of the thicknesses $t_d$ of the distal portions 30 and 36 of the first section and second section crotch area pipe stops 26 and 32 within the plane 25 defined by the first and second longitudinal axes 20 and 22.

The purpose of the thickening of the pipe stops 26 and 32 in the crotch area is to add strength to the critical crotch area without adding unnecessary material, as well as to gain the benefit of adding material to the inside of the fitting 10 instead of to the outside of the fitting 10.

Figure 7:
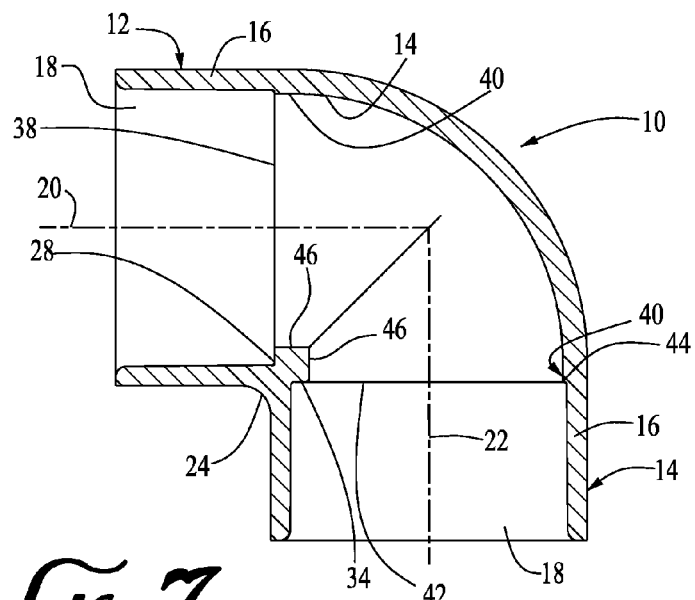
FIG. 7 is a cross-sectional side view of the pipe fitting illustrated in FIGS. 6A and 6B.

As illustrated in FIGS. 6A, 6B and 7, the cross-section of the cylindrical first section 12 within the plane defined by the face of the first crotch area pipe stop 26 is a first crotch point open area 38 having an eccentric periphery 40. Similarly, the cross-section of the cylindrical second section 14 within the plane defined by the face of the second crotch area pipe stop 32 is a second pipe stop open area 42 having an eccentric periphery 40.

In both cases, such eccentric periphery 40 can comprise a major circular portion 44 and a non-circular portion 46. The term "major circular portion" as used in this application means a curve spanning at least about 120° of arc wherein all points on the curve are equidistant from a single point. Typically, that single point coincides with the longitudinal axis 20 or 22 of the respective cylindrical section 12 or 14.

The term "non-circular portion" as used in this application means a curve wherein all points on the curve are not equidistant from a single point. Examples of non-circular portions include, but are not limited to, ellipsis, portions of circles having several different radii, portions of circles having the same radii but different centers, and pluralities of short straight lines. In the embodiments illustrated in the drawings, the non-circular portion 46 is an elliptical portion.

The invention is contrasted with conventional pipe fittings 100 of the prior art as illustrated in FIGS. 1 and 2, wherein the cross-section of each flow path 101 in such fittings has a wholly circular shape.

In the embodiment illustrated in FIGS. 6A, 6B and 7, the non-circular non-circular portion 46 of the periphery 40 of the first crotch point open area 38 is disposed most proximate to the crotch point 24. Accordingly, the width of the first crotch point open area 38 measured along a first line segment 48 running between a point most proximate to the crotch point 24, through the first longitudinal axis 20, and to a point on the opposite wall of the first section 12, is shorter than the width of the first crotch point open area 38 measured along a second line segment 50 disposed perpendicular to the first line segment 48 and running between opposite sides of the cylindrical first crotch point open area 38 and passing through the first longitudinal axis 20.

Typically, the non-circular portion 46 of the periphery 40 of the first crotch point open area 38 has a midpoint 52, a first end point 54 and an opposed second end point 56. The midpoint 52 of the periphery 40 of the non-circular portion 46 of the first crotch point open area 38 is disposed at the point along the periphery 40 of the first crotch point open area 38 most proximate to the crotch point 24. An angle β is defined between a first ray 58 passing through the first end point 54 of the non-circular portion 46 of the first crotch point open area 38 and the first longitudinal axis 20 and a second ray 60 passing through the second end point 56 of the non-circular portion 46 of the first crotch point open area 38 and the first longitudinal axis 20. Such angle β is typically between about 45° and about 180°, more typically between about 60° and about 120°, and most typically between about 80° and about 100°, such as about 90°. The ratio of the length of the first line segment 48 to the length of the second line segment 50 is typically between about 0.75 and about 0.98.

Similarly, the non-circular portion 46 of the periphery 40 of the second crotch point open area 42 is disposed most proximate to the crotch point 24. Accordingly, the width of the second crotch point open area 42, measured along a third line segment 62 running between a point most proximate to the crotch point 24, through the second longitudinal axis 22, and to a point on the opposite wall of the second section 14, is shorter than the width of the second crotch point open area 42 measured along a fourth line segment 64 disposed perpendicular to the third line segment 54 and running between opposite sides of the cylindrical second crotch point open area 42 and passing through the second longitudinal axis 22.

Typically, the non-circular portion 46 of the periphery 40 of the second crotch point open area 42 has a midpoint 66, a first end point 68 and an opposed second end point 70. The midpoint 66 of the periphery 40 of the second crotch point open area 42 is disposed at the point along the periphery 40 of the second crotch point open area 42 most proximate to the crotch point 24. An angle γ is defined between a third ray 72 passing through the first end point 68 of the non-circular portion 46 of the periphery 40 of the second crotch point open area 42 and the second longitudinal axis 22 and a fourth ray 74 passing through the second end point 70 of the non-circular portion 46 of the periphery 40 of the second crotch point open area 42 and the second longitudinal axis 22. Such angle γ is typically between about 45° and about 180°, more typically between about 60° and about 120°, and most typically between about 80° and about 100°, such as about 90°. The ratio of the length of the third line segment 62 to the length of the fourth line segment 64 is typically between about 0.75 and about 0.98.

Figure 8:
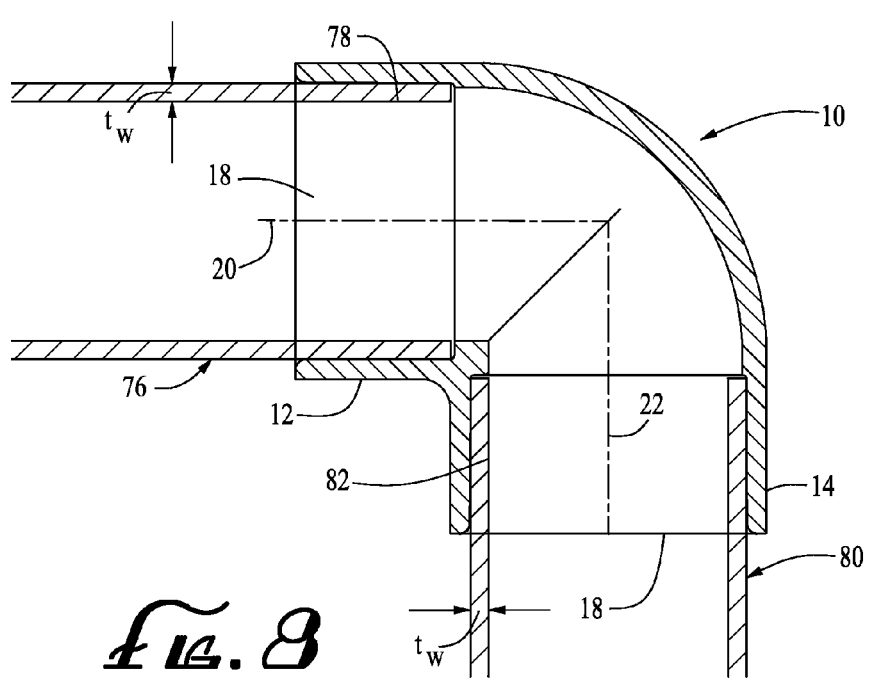
FIG. 8 is a cross-sectional side view of the pipe fitting illustrated in FIGS. 6A and 6B, showing the pipe fitting in combination with a pipe section.

FIG. 8 illustrates a combination wherein the reinforced pipe fitting of the invention 10 is combined with a first pipe section 76 having a first pipe section end 78 and a second pipe section 80 having a first pipe section end 82. Each first pipe section end 78 and 82 has an outside diameter, an inside diameter and a wall thickness $t_w$. For relatively small fittings, such as two-inch fittings, the first section crotch area pipe stop proximal portion 28 of the reinforced pipe fitting 10 typically has a thickness $t_p$ between about 50% and about 110% of the wall thickness $t_w$ of the first wall section end 78 of the first pipe section 76, and the second section crotch area pipe stop proximal portion 34 has a thickness between about 50% and about 110% of the wall thickness $t_w$ of the first pipe section end 82 of the second pipe section 80.

Thus, in the invention, material is added to the most critical area and nothing is added to areas that cannot benefit from additional material. The amount of material is typically determined by making the inside wall of the thickest section flush with the inside wall of a pipe of the same size with a minimum flow path diameter as determined by ASTM standards. This thickest section tapers radially in an arc of typically 45° from each side of the midpoint of the crotch point openings, and results in a typical wall section equal to about 125% of the wall section for the same size pipe as determined by ASTM standards.

By way of example, a 2" pipe meeting ASTM standard D1785 has an outside diameter of 2.375"±0.006" and a minimum wall thickness of 0.154". Thus, its normal inside radius is (2.375)/(2)−(0.154)=1.0335. A 2" schedule 40 fitting having features of the invention might have a minimum wall thickness of 0.193", a cylindrical first opening inside diameter of 2.387"±0.006", and a cylindrical first opening wall thickness of 0.154", all pursuant to ASTM standard D2466. In such fitting, a typical outside diameter of the fitting body is therefore (2.387)+(2)*(0.154)=2.695", the typical inside diameter of fitting is (2.695)−(2)*(0.193)=2.309", and its radius is (2.309)/(2)=1.1545. Thus, for a 2" fitting the inside radius at the center of the crotch would be 1.0335", blending out elliptically in 45° to a radius of 1.1545".

Some reinforced pipe fittings of the invention, depending on their size and geometry may require less material. In such cases, the inside radius of such fittings would be larger but would still blend out at about 45°. Also, the flow path of a reinforced pipe fitting 10 of the invention may be smaller or larger than that described above. In this case the additional material would still blend out at 45°.

Thus, the pipe fitting of the invention adds material only where it will make the biggest contribution to the strength. Adding material to the inside of a fitting has the added advantage of reducing the effective inside diameter, and thus the hoop stresses in the fitting are reduced. Also, the added material improves burst and long-term strength and significantly improves cyclic/fatigue strength.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A reinforced pipe fitting having a body with a cylindrical first section and a cylindrical second section, the cylindrical first section having side walls, a first entrance opening and a first longitudinal axis, the cylindrical second section having side walls, a second entrance opening and a second longitudinal axis, the first longitudinal axis and the second longitudinal axis intersecting at an angle between about 90° and about 180°, the side walls of the cylindrical first section and the side walls of the cylindrical second section intersecting defining an internal crotch point disposed within the plane defined by the first longitudinal axis and the second longitudinal axis, wherein the cross-section of the cylindrical first section, taken along a plane perpendicular to the first longitudinal axis and passing through the crotch point, defines a first crotch point open area with a periphery comprising a major circular portion spanning an arc of at least about 120° and a non-circular portion, the non-circular portion of the periphery of the first crotch point area being disposed most proximate to the crotch point, whereby the distance of the first crotch point opening, measured along a first line segment running between a point most proximate to the crotch point, through the first longitudinal axis, and to a point on the opposite wall of the cylindrical first section is shorter than the distance of the first crotch point opening measured along a second line segment disposed perpendicular to the first line segment and running between opposite sides of the cylindrical first crotch point open area and passing through the first longitudinal axis; and wherein the cross-section of the cylindrical second section, taken along a plane perpendicular to the second longitudinal axis and passing through the crotch point, defines a pipe stop open area with a periphery comprising a major circular portion spanning an arc of at least about 120° and a non-circular portion, the non-circular portion of the periphery of the pipe stop area being disposed most proximate to the crotch point, whereby the distance of the pipe stop opening, measured along a third line segment running between a point most proximate to the crotch point, through the second longitudinal axis, and to a point on the opposite wall of the cylindrical second section is shorter than the distance of the pipe stop opening measured along a fourth line segment disposed perpendicular to the third line segment and running between opposite sides of the cylindrical pipe stop open area and passing through the second longitudinal axis.

2. The reinforced pipe fitting of claim 1
   (a) wherein the first section defines a first section crotch area pipe stop having a first section crotch area pipe stop proximal portion disposed proximate to the crotch point and a first section crotch area pipe stop distal portion disposed opposite the first section crotch area pipe stop proximal portion; and
   (b) wherein the average thickness of the first section crotch area pipe stop proximal portion disposed 15° to either side of the plane defined by the first and second longitudinal axes is greater by at least about 15% than the average thickness of the first section crotch area pipe stop distal portion disposed 15° to either side of the plane defined by the first and second longitudinal axes.

3. The reinforced pipe fitting of claim 2 wherein the second section defines a second section crotch area pipe stop having a second section crotch area pipe stop proximal portion disposed proximate to the crotch point and a second section crotch area pipe stop distal portion disposed opposite the second section crotch area pipe stop proximal portion, and wherein the average thickness of the second section crotch area pipe stop proximal portion disposed 15° to either side of the plane defined by the first and second longitudinal axes is greater by about 15% than the average thickness of the second section crotch area pipe stop distal portion of the second section crotch area pipe stop 15° to either side of the plane defined by the first and second longitudinal axes.

4. The reinforced pipe fitting of claim 2 wherein the thickness of the first section crotch area pipe stop proximal portion disposed within the plane defined by the first and second longitudinal axes is greater than about 20% of the thickness of the first section crotch area pipe stop distal portion within the plane defined by the first and second longitudinal axes.

5. A combination comprising the reinforced pipe fitting of claim 2 in combination with a pipe section, wherein the pipe section has a first pipe section end with an outside diameter, an inside diameter and a wall thickness and wherein the first section crotch area pipe stop proximal portion has a thickness of between about 50% and about 110% of the wall thickness of the first pipe section end, the first pipe section end being disposed within the first section of the reinforced pipe fitting and in abutment with the first section crotch area pipe stop proximal portion and first section crotch area pipe stop distal portion.

6. The reinforced pipe fitting of claim 1 wherein the non-circular portion of the first crotch point open area has a midpoint, a first end point and an opposed second end point, wherein the midpoint of the first crotch point open area is disposed at the point along the periphery of the first crotch point opening area most proximate to the crotch point, and wherein the angle defined between a first ray passing through the first end point of the non-circular portion of the first crotch point open area and the first longitudinal axis and a second ray passing through the second end point of the first crotch point open area and the first longitudinal axis is between about 60° and about 120°.

7. The reinforced pipe fitting of claim 1 wherein the non-circular portion of the first crotch point open area has a midpoint, a first end point and an opposed second end point, wherein the midpoint of the first crotch point open area is disposed at the point along the periphery of the first crotch point open area most proximate to the crotch point, and wherein the angle defined between a first ray passing through the first end point of the non-circular portion of the first crotch point open area and the first longitudinal axis and a second ray passing through the second end point of the first crotch point open area and the first longitudinal axis is between about 80° and about 100°.

8. The reinforced pipe fitting of claim 1 wherein the ratio of the distance of the first line segment to the distance of the second line segment is between about 0.75 and about 0.98.

9. The reinforced pipe fitting of claim 1 wherein the ratio of the distance of the first line segment to the distance of the second line segment and the ratio of the distance of the third line segment to the distance of the fourth line segment are both between about 0.75 and about 0.98.

10. The combination of a pipe section and the reinforced pipe fitting of claim 1:
   wherein the pipe section has a first pipe section end with an outside diameter, an inside diameter and a wall thickness; and
   wherein the first entrance opening of the reinforced pipe fitting has an inside diameter which closely matches the outside diameter of the first end of the pipe section, such that the first end of the pipe section is snugly disposed within the first entrance opening of the reinforced pipe fitting.

11. A reinforced pipe fitting having a body with a cylindrical first section and a cylindrical second section, the cylindrical first section having side walls, a first entrance opening and a first longitudinal axis, the cylindrical second section having side walls, a second entrance opening and a second longitudinal axis, the first longitudinal axis and the second longitudinal axis intersecting at an angle less than 180°, the side walls of the cylindrical first section and the side walls of the cylindrical second section intersecting at a crotch point disposed within the plane defined by the first longitudinal axis and the second longitudinal axis,
   wherein the cross-section of the cylindrical first section, taken along a plane perpendicular to the first longitudinal axis and passing through the crotch point, defines a first crotch point open area with a periphery comprising a major circular portion spanning an arc of at least about 120° and an elliptical portion, the elliptical portion of the periphery of the first crotch point area being disposed most proximate to the crotch point, whereby the distance of the first crotch point opening, measured along a first line segment running between a point most proximate to the crotch point, through the first longitudinal axis, and to a point on the opposite wall of the cylindrical first section is shorter than the distance of the first crotch point opening measured along a second line segment disposed perpendicular to the first line segment and running between opposite sides of the cylindrical first crotch point open area and passing through the first longitudinal axis; and
   wherein the cross-section of the cylindrical second section, taken along a plane perpendicular to the second longitudinal axis and passing through the crotch point, defines a pipe stop open area with a periphery comprising a major circular portion spanning an arc of at least about 120° and an elliptical portion, the elliptical portion of the periphery of the pipe stop area being disposed most proximate to the crotch point, whereby the distance of the pipe stop opening, measured along a third line segment running between a point most proximate to the crotch point, through the second longitudinal axis, and to a point on the opposite wall of the cylindrical second section is shorter than the distance of the pipe stop opening measured along a fourth line segment disposed perpendicular to the third line segment and running between opposite sides of the cylindrical pipe stop open area and passing through the second longitudinal axis.

12. The reinforced pipe fitting of claim 11 wherein the elliptical portion of the first crotch point open area has a midpoint, a first end point and an opposed second end point, wherein the midpoint of the first crotch point open area is disposed at the point along the periphery of the first crotch point opening area most proximate to the crotch point, and wherein the angle defined between a first ray passing through the first end point of the elliptical portion of the first crotch point open area and the first longitudinal axis and a second ray passing through the second end point of the first crotch point open area and the first longitudinal axis is between about 45° and about 180°.

13. The reinforced pipe fitting of claim 11 wherein the ratio of the distance of the first line segment to the distance of the second line segment is between about 0.75 and about 0.98.

14. The reinforced pipe fitting of claim 11 wherein the ratio of the distance of the first line segment to the distance of the second line segment and the ratio of the distance of the third line segment to the distance of the fourth line segment are both between about 0.75 and about 0.98.

* * * * *